United States Patent Office 3,508,682
Patented Apr. 28, 1970

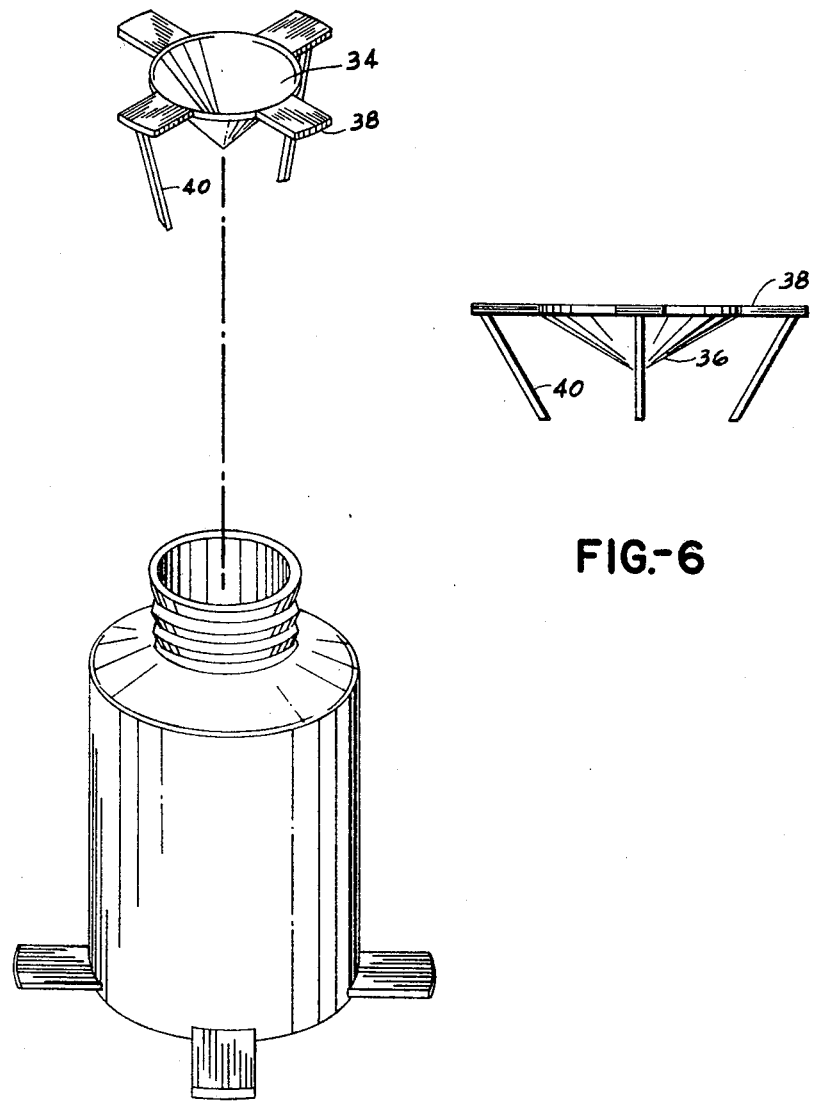

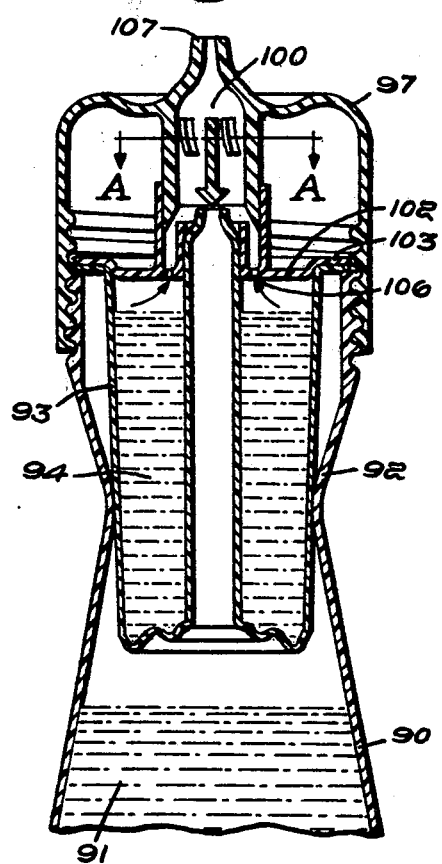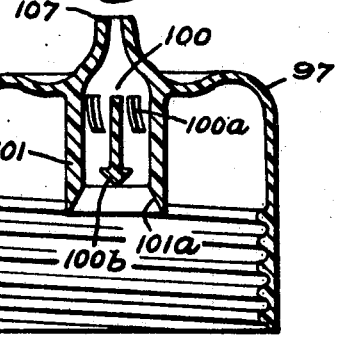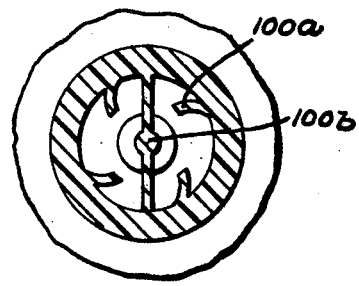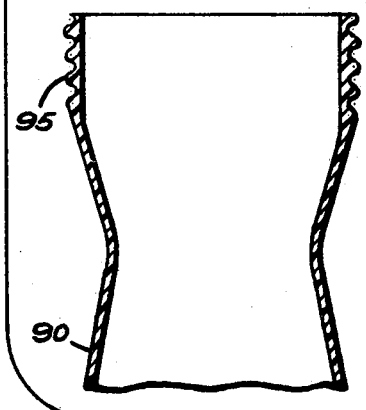

3,508,682
DISPENSING OF DETERGENT BLENDS OF PREDETERMINED STRENGTH
Morton Hollis, Boston, Mass., and Kenneth N. Sherman, Stamford, Conn., assignors, by direct and mesne assignments, of seventy percent to Kenneth N. Sherman, Newton, Mass., and thirty percent to Cambridge Research and Development Group, Westport, Conn., a limited partnership of Connecticut
Continuation-in-part of application Ser. No. 351,780, Mar. 3, 1964. This application Aug. 14, 1967, Ser. No. 668,274
Int. Cl. B67d
U.S. Cl. 222—48          7 Claims

ABSTRACT OF THE DISCLOSURE

A hand operative dispenser for dispensing a liquid detergent blend of predetermined strength comprises two chambers containing a low strength detergent and a high strength detergent, a mixing chamber with a dispensing nozzle, connecting passageways from the two chambers to the mixing chamber, and hand operative valve means adapted to vary the flow of liquid through one of the connecting passageways. The valve means is indexed to indicate the strength of the detergent blend being dispensed.

Preferably, one of the detergents contains an indicator that imparts a predetermined color to the detergent blend dependent on the mixing ratio of the high and low strength detergents.

RELATED APPLICATION

This application is a continuation-in-part of "Adjustable Liquid System and Dispenser," Ser. No. 351,780, filed Mar. 3, 1964, now abandoned, by the present inventors.

BACKGROUND OF THE INVENTION

There are available a great variety of household detergents having different strength characteristics because different cleaning jobs require detergents of different strengths, for example, there are the heavy duty detergents and others known as mild or light duty detergents. Whereas a heavy duty detergent may be required for one cleaning task, such a detergent may be too strong for another task. On the other hand, a light duty detergent may not have sufficient strength to clean in certain circumstances where a heavy duty detergent is required.

As is well known, a heavy duty detergent may have deleterious effects on the hands of the user, whereas a low strength detergent which is easier on the hands of the user is not as an effective a cleaner. Accordingly, there is no effective single detergent which can satisfy the requirement of a heavy and a light duty detergent from the standpoints of cleaning and mildness to the hands of the user.

As a result, the average housewife obtains and has available different cleaners of varying strengths for the various types of cleaning tasks. Since there are many cleaning tasks to be performed by the average housewife in the average home, this practice necessitates keeping a rather large and cumbersome supply of detergents on hand.

THIS INVENTION

The present invention solves the foregoing problems with a self-contained package adapted to dispense a composition ranging from a heavy duty detergent to a light duty detergent. The package includes a supply of a light duty or base detergent solution and a supply of a heavy duty or concentrated detergent solution. These solutions are mixed in predetermined controlled quantities dependent upon the particular requirements of the cleaning job at hand.

Although for convenience of reference the present invention has and will be described with reference to a "cleaner," it is to be understood that the present invention is not to be so limited but can be utilized in dispensing detergent compositions having various properties, e.g., variable germicidal activities.

In accordance with the present invention, zones of heavy and light duty liquid detergents and means for regulating the flow of said detergents from said zones are mounted in a self-contained package or container so as to permit discharge of a detergent having variable predetermined strength characteristics. The zones contain a base solution and a concentrate solution. A control means having indicia means such as a dial is provided for accurately regulating the flow of the detergent liquids and thereby the characterisics of the detergent being dispensed. Conveniently, the self-contained package of the present invention is small enough to be hand-carried by the user.

In practice, suitable results can be obtained by providing at least one zone containing a supply of a commercially-available heavy duty liquid detergent and at least one zone containing a supply of a commercial light duty detergent. The dispensed products obtained by the use of such detergent systems would be a physical admixture of the components and would possess properties intermediate to those of the components thereof. In the preferred aspect of the invention, optimum results are obtained by employing heavy duty and light duty liquid detergents which, in their chemically unmodified forms, possess, characteristics which would render them unacceptable for household use.

For example, the preferred heavy duty detergents of our invention can possess caustic properties which would render them unsuitable as household cleaners. Similarly, the light duty detergents of the invention can be of such mildness as to be unsatisfactory as cleansers in their unmodified form. Inasmuch as the dispensing devices of the present invention can be designed as to insure that at no time will the dispensed product consist entirely of light duty detergent, also referred to as "base solution," or heavy duty also referred to as "concentrate," the use of the preferred detergent systems in the practice of the invention presents no problem as to the safety or effectiveness of the dispensed product. On the other hand, such preferred detergent systems permit the user to obtain products, which are the result of the chemical interaction between variable amounts of concentrate and the base solution, which can be milder than any of the commercially available light duty detergents and thus useful where unusually extreme mildness is desired, or which can be stronger and more effective than the commercial heavy duty detergents and therefore effective for tasks which require uncommon strength, such as cleaning household ovens and the like.

Although the invention is not limited thereto, in this preferred embodiment of the invention ratio of the concentrated solution and the base solution is controlled by regulating the amount of flow of the concentrate fluid. In other words, the variable strength detergent is produced by chemically modifying the cleaning strength of a base solution by the addition of variable amounts of a concentrate.

A detergent dispenser of this type must satisfy several criteria. For example, since the heavy duty detergent if dispenses by itself might be injurious, it is desirable to provide means for preventing the expulsion thereof unless the light duty detergent is being dispensed, as might be the case when the light duty detergent is exhausted. Usually some of the heavy duty detergent will remain after the light duty detergent is exhausted and it is desirable to camouflage this fact so that a housewife's desire not to be wasteful will not be offended. There should be means for preventing the commingling or flow-back of the heavy duty detergent into the compartment containing the light duty detergent. Means for positive sealing the container when not in use is also desirable.

An important consideration when the two liquids being dispensed are intended to physically or chemically react as is the case with the preferred embodiment of this invention, is to provide means to assure good mixing of the two as opposed to simple co-mingling or "side-by-side" dispensing. If mixing is incomplete, for example, in the case where one of the detergents contains an indicator intended to develop a certain color in the dispensed liquids indicative of the strength thereof, then the streams of the two dispensed liquids are quite apparent to the eye, even though co-mingled. Also, in the arrangement where the concentrate is extremely caustic, to permit it to be dispensed without adequate dilution with the base solution could result in irritation to the hands of the user.

With the foregoing in mind, it is an object of the present invention to provide a self-contained package for dispensing a liquid having a property which is adjusted or controlled.

Another object of this invention is to provide a self-contained adjustable detergent package for making and dispensing fluid detergents with predetermined variable strength characteristics.

It is intended that hereinafter the words "indicia" or "indicia means" shall mean the physical indicating means for selecting the proportion of liquids to be dispensed and the word "indicator" shall mean the chemical addition to the liquid to give a color to the mixture which is variant with the strength of mixture obtained.

DRAWINGS

The accompanying drawings are incorporated in and constitute a part of this specification and together with the description serve to explain the principles of the invention.

In the drawings:

FIGURE 5 is an exploded perspective view of certain elements of the device shown in FIGURE 4.

FIGURE 6 is a side elevational view of one element of the FIGURE 4 embodiment of the invention.

FIGURE 9 is a longitudinal cross-sectional view of a third form of a dispenser embodying the principles of this invention.

FIGURE 10 is an "exploded" cross-sectional view of the dispenser shown in FIGURE 9.

FIGURE 11 is a cross-sectional view taken along line A—A of FIGURE 9 and showing in more detail the arrangement of the mixing chamber.

PREFERRED EMBODIMENTS

Although the invention is not limited to or restricted to a particular formula for the high strength liquid concentrate any one of the following may be used to practice the preferred form of the present invention.

(1) Forty to sixty percent by weight of sodium metasilicate, a sufficient quantity of a conventional suds inhibitor and water.

(2) Forty percent by weight of sodium polyphosphate or potassium polyphosphate, a sufficient quantity of suds inhibitor and water.

(3) Sixty percent by weight sodium hydroxide or potassium hydroxide, a sufficient quantity of suds inhibitor and water.

(4) Ninety-nine percent by weight alkanolamine, a sufficient quantity of suds inhibitor and the remainder, water.

Similarly, many formulae may be used in the formation of the base solution or the low duty detergent, none of which are limiting or restrictive of the present invention.

Thus the main solution can comprise of about thirty-two percent by weight of:

(a) Ammonium soap of an arylalkylsulfonate, or
(b) Ammonium soap of an alkylsulfonate, or
(c) Ammonium soap of an N-fatty acid aminopropionate, or
(d) Ammonium soap of iminodipropionate, and
(e) Sufficient quantities of conventional additives such as opacifiers, perfume, soluble lanolin, bacteriacide, etc.
(f) One-sixteenth of one per cent of a viscosity agent, and
(g) One-eighteenth of one percent of a surfactant such as a flourocarbon.
(h) With the balance being water.

The formulae set forth above are not to be considered as limitations on the present invention but are only illustrative of the types of formulae which may be usable with the present invention. The primary criteria of the formulae for the heavy and light duty strength liquid detergents is that the detergents be compatible with one another and adapted to be mixed in predetermined amounts to form a detergent of predetermined strength, either by physical admixture or by chemical interaction.

Figure 1:
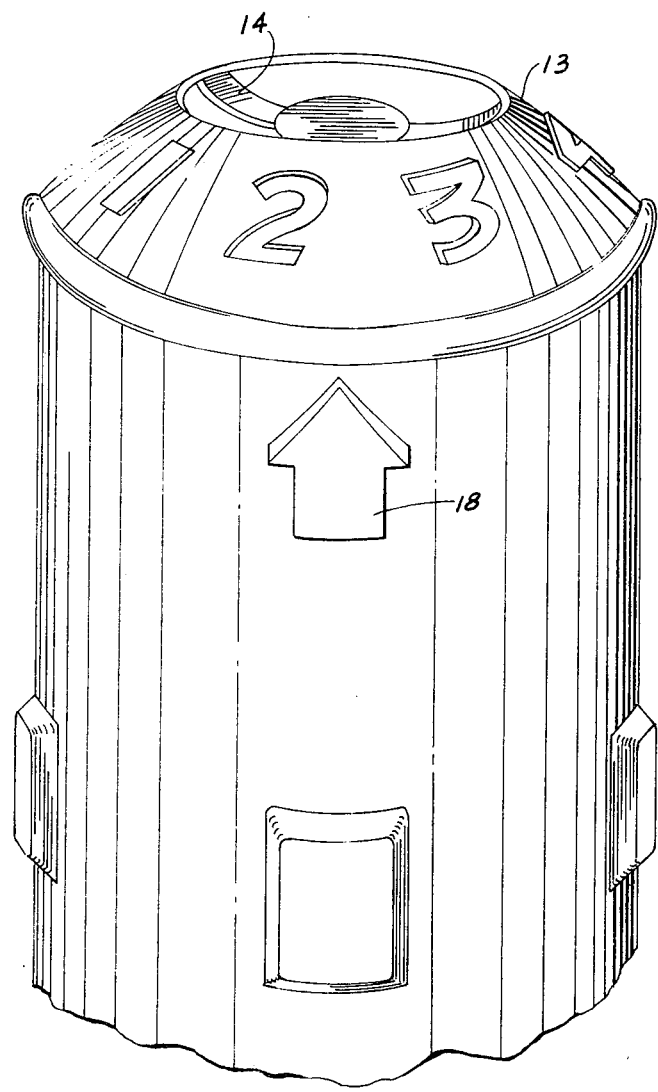
FIGURE 1 is a partial perspective view of a device embodying the present invention.
Figure 2:
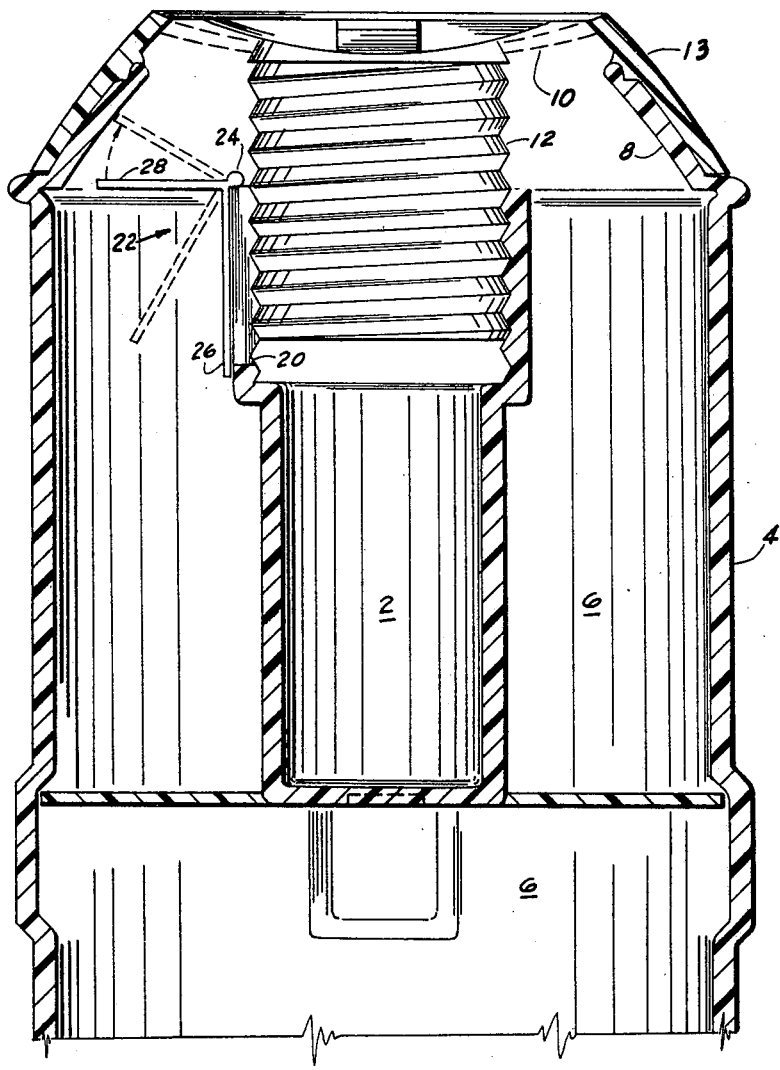
FIGURE 2 is a longitudinal sectional view of the device shown in FIGURE 1.
Figure 3:
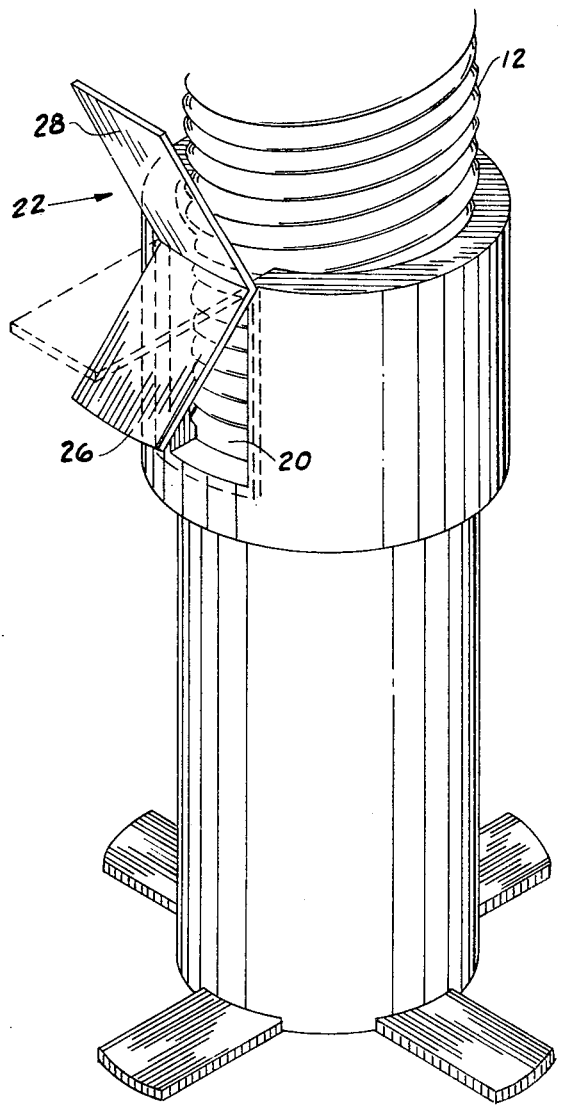
FIGURE 3 is a perspective view of the device shown in FIGURE 1 with certain elements removed.

One form of a device capable of discharging the adjustable detergent of the present invention is illustrated in FIGURES 1–3. As shown therein there is a package or container having a plurality of zones for the heavy and light duty strength detergents. As embodied, there is a first zone or chamber 2 adapted to hold the concentrate or heavy duty liquid detergent. Since in the embodiment shown the package or container is generally circular in form, this first zone or chamber extends along the longitudinal axis of the outer container 4 and is concentric therewith. A second zone or chamber 6 for the light duty detergent is located within the package or container and as embodied has a portion concentric with and in surrounding relation to the first chamber 2.

Preferably the volume of the zone or chamber for the low strength detergent is about fifteen times the volume of the zone or chamber for the concentrated heavy duty detergent. Accordingly, the second zone or chamber for the light duty liquid detergent may extend below the bottom of the first zone or chamber as shown in FIGURE 2.

In accordance with this invention means are provided for regulating the flow of predetermined ratios of the heavy and light duty detergents so as to form detergents having predetermined but variable characteristics.

As embodied, the package includes an outer container 4 having a frusto-conical portion 8 at one end thereof defining a mixing chamber. The frusto-conical portion 8 has a circular opening 10 at its top through which the liquid detergent passes upon discharge from the package.

The upper and inner end of the first zone or chamber for the concentrate is threaded and adapted to receive a threaded plug member 12. The outer end of the plug member has integral therewith a dial member 13 having ears 14 (FIG. 1) attached to the plug member 12 so that the plug member moves in reference to movement of the dial member. The dial member has on its outer surface a plurality of indicia 16 which can be any suitable amount of numbers. On the outer surface of the container is a stationary indicia or arrow 18 with which the numbers on the dial 13 are aligned to determine the strength of the detergent to be discharged from the device.

As shown in FIGURE 2 of the drawings, there is an aperture or opening 20 at the upper end of the first zone or chamber for the concentrate. The plug member 12 moves to different vertical positions according to the setting of the dial member and thus covers or uncovers a smaller or larger portion of the opening 20 to thereby control the amount of concentrate which can be dispensed from the first zone or chamber. The plug member and dial mechanism consitute therefore a metering means for controlling and regulating the flow of the concentrate or high strength detergent.

The device of the present invention includes valve means for preventing the mixing and discharge of the adjustable detergent unless the device is in a predetermined position. More particularly, the valve means of the present invention is constructed and arranged so that discharging of the concentrated high strength liquid detergent and accordingly, mixing of the high and low strength liquid detergents is prevented until the position of the package or container is substantially inverted.

As shown in FIGURES 2 and 3, the valve means of the present invention comprises what is commonly known as a butterfly valve 21. One suitable material for the first zone or chamber is an injection molded polypropylene. Accordingly, molded intergarl to the upper outer surface of the first chamber is a substantially L-shaped valve member 22 having a hinged connection 24 with the outer surface of the concentrate chamber. One leg 26 of the valve member normally extends generally downwardly to a position where it can cover and thereby close the opening 20 in the upper end of the first zone. The other leg 28 of the valve member extends at a substantially right angle to the first leg and is generally horizontally disposed. It will be understood that because of the nature and characteristics of the materials involved, the valve member is spring biased into the closed position. When, however, the position of the package or containers is inverted, the low strength base solution will engage the leg 28 of the valve member, the valve member will pivot about its hinged connection and the opening 20 in the first chamber will be unobstructed so that the low strength detergent can draw the high strength liquid detergent from its chamber or zone into contact with low strength liquid detergent, both of them passing into the mixing zone. This position of the butterfly valve shown in dotted lines in FIGURE 2 and in full lines in FIGURE 3. By its nature, the butterfly valve serves as a baffle, causing mixing of the high strength detergent liquid with the low strength detergent as they pass by gravity around legs 26 and 28 in their open position and into the mixing chamber formed by frusto-conical portion 8.

In FIGURES 4 to 8 another form of a device is illustrated which is adapted to dispense the adjustable detergent in accordance with this invention. In this modified device there is provided a first zone or chamber 30 for the concentrate or high strength liquid detergent and a second zone or chamber 32 for the base solution low strength liquid detergent. As in the case of the embodiment shown in FIGURES 1 to 3, the second zone is considerably larger in volume than the first zone and preferably at least 15 times larger.

Valve means is provided in this device for controlling the discharge of the high strength detergent with respect to the low strength detergent so that a detergent of any intermediate strength can be discharged from the device. As embodied, there is provided a cap member 34 having a central portion 36 which is generally funnel shaped in cross section which normally extends into the inner container. Extending from the funnel shaped member are a plurality of horizontal paddle members 38 (see FIGURES 5 and 6) and extending downwardly and into engagement with the neck of the inner container are a plurality of spring fingers 40 biased into engagement with the neck of the container (FIGURE 4).

In accordance with this modified device dial means are provided so that a liquid detergent of predetermined strength will be discharged from the device. As shown in FIGURES 4–8 this means includes a dial member 44 threaded at one end to the outer container 46 and having at its other end a closure member 47 with a plurality of apertures 48 therein. Extending downwardly from the center portion of the closure member is a peg or stop 50. The peg member, when the device is not in use engages the center portion of the funnel shaped member and seals the inner container (FIG. 4). By turning the dial sleeve 44 the vertical position of the peg member with respect to the funnel shaped member can be changed and thereby controlled and at the same time the space between the inner and outer zones or containers also changes. The position of the peg member controls and determines the amount of concentrate flowing from the inner zone 30. Thus a low position for peg 50 will permit only a small amount of concenerate to be discharged whereas a high position for peg 50 will permit a greater amount of concentrate to be discharged.

Figure 8:
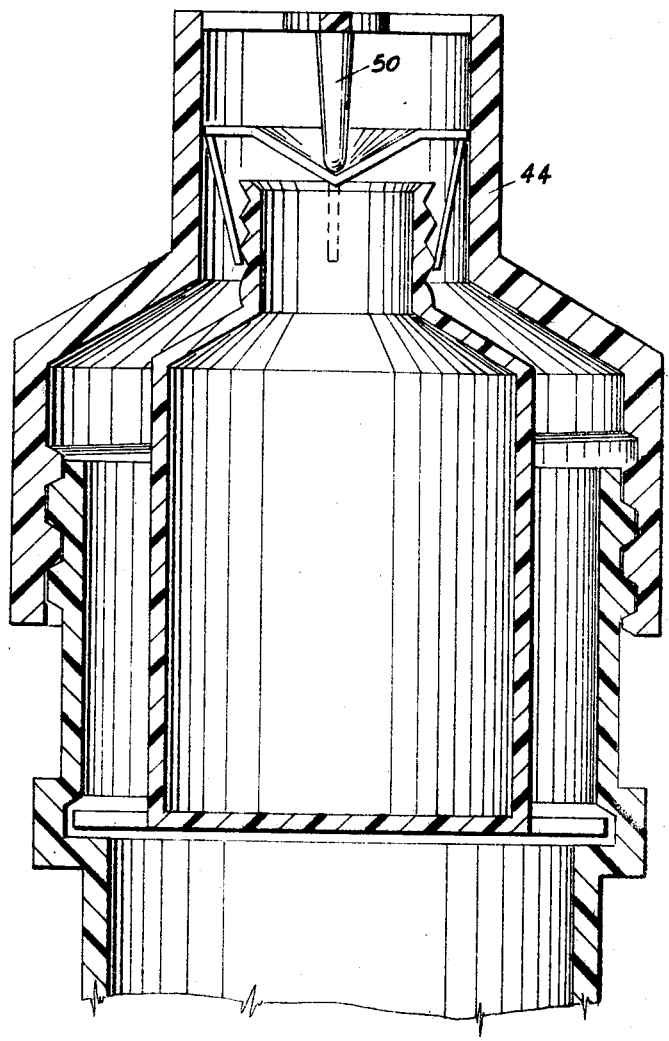
FIGURE 8 is a longitudinal sectional view similar to FIGURE 4 showing the device in another position.

The position of the peg member and its associated elements when the package is adapted to discharge the detergent is shown in FIGURE 8.

Figure 4:
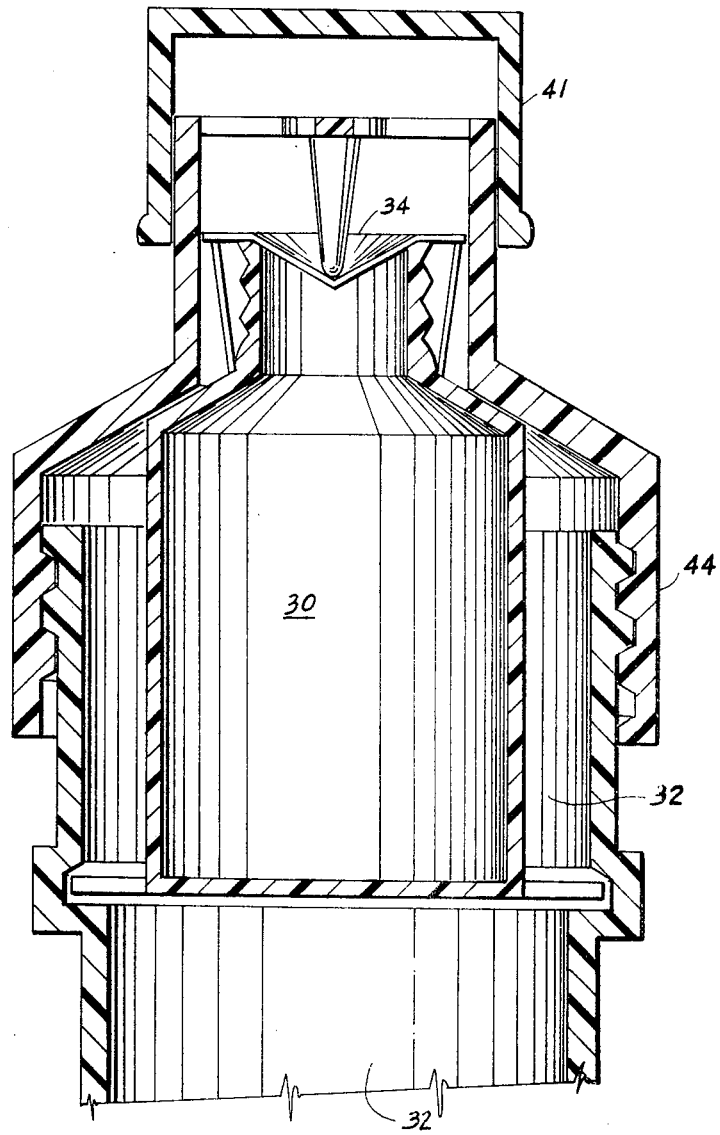
FIGURE 4 is a longitudinal sectional view of another embodiment of the present invention.
Figure 7:
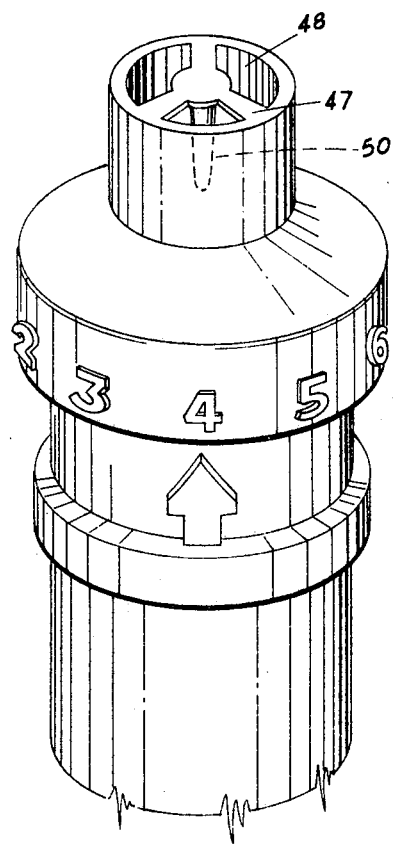
FIGURE 7 is a perspective view of the device shown in FIGURE 4.

As can be seen in FIGURES 4 and 7, the neck of the inner container has a tapered construction so that the spring finger 40 can return the cap member to the closed positions, FIGURE 4, even though the device is inverted as soon as the flow of liquid stops. In this manner, accidental discharge of the concentrate is prevented after the base solution has been used up.

In operation, the dial 44 is set dependent upon the strength of the detergent to be discharged from the device when the device is inverted. Upon inversion of the package, the base solution or light duty detergent will flow towards the discharge end of the device and will engage the paddles 38 on the funnel shaped closure cap 34 thereby moving the cap away from the opening of the inner container until the funnel shaped cap engages the peg 50.

In order to seal the device, a closure cap 41 is provided having a friction fit with the end of the metering sleeve. The closure cap is of course removed when the device is in use.

FIGURES 9–11 depict another embodiment of the invention in cross-section. As illustrated, the dispenser consists of a plastic squeeze bottle 90 containing the base solution 91. The bottle has a tapered circular neck 92 that forms a squeeze fit with an inner cylindrical plastic container 93 that contains the concentrate 94. Bottle 90 ends in threads 95 that mate with threads 96 on cap member 97. Cap member 97 is rotatable about the threads and will raise or lower as desired. Suitable indicia (not shown) are carried on the cap member to indicate its relative position and thus the relative proportion of the liquids being dispensed.

Inner container 93 has molded into its base 98 corrugations such that the base will serve as a diaphragm response to changes in pressure inside the main container 90. A central tube 99 ending in a nozzle 99a runs through container 93 and thus connects interior of bottle 90 with a mixing chamber 100 defined by cylindrical walls 101 dependent from cap 97. Mixing chamber 100 contains mixing vanes 100a, a control plug 101b, and ends in a discharge nozzle 107.

Inner container 93 is sealed by an inner cover 102 that makes a force fit therewith and extends over to engage at 103 the lip of bottle 90. The inner cup carries two concentric cylindrical sleeevs 104 and 105. The inner sleeve 105 makes a relatively tight fit with tube 99 sufficient to prevent any liquid flow therebetween, but the fit is such to permit relative movement between the two. The outer sleeve 104 mates with sleeve 101 forming a slidable seal therewith. Small apertures 106 exist between sleeves 104 and 105 in inner cover 102 to permit the passage of liquid. Preferably the size of these apertures is such that when the container is inverted, liquid 94 will not flow therethrough by gravity alone, but will require the assist of some additonal pressure.

It will be noted that sleeve 101 ends in a taper or frustoconical surface 101a that mates with the upper edge of sleeve 105. The dispenser is illustrated in a partly open position. When cap 97 is fully seated, surface 101a contacts sleeve 105 forming a seal therewith such that the contents 94 of container 93 cannot be dispensed. Also control plug 101b seats in nozzle 99a and seals it to prevent the flow of liquid 91 therethrough. As cap 97 is rotated to the open position, it rises, allowing surfaces 101a to form with sleeve 105 an annular aperture of gradually increased area. Thus, positioning of the cap in a select position will control the amount of liquid passing through this aperture.

In operation, the dispenser cap 97 is set in some intermediate position for the strength of detergent desired and then is inverted with squeezing of bottle 90. The interior pressure created by the squeezing forces liquid 91 through tube 99 and by operating through diaphragm 98 liquid 94 is forced through openings 106 and past the annular aperture around sleeve 105. Liquid 91 assists to some extent removal of liquid 94 by aspiration as it issues from nozzle 99a. The two liquids enter mixing chamber 100 and are thoroughly mixed by the turbulence given by vanes 100a and plug 101b. Thereafter they are expelled through nozzle 107.

When liquid 91 is exhausted, some of liquid 94 may still remain. However, if the dispenser were inverted and squeezed, the air in bottle 90 exits rather readily through tube 99, creating insufficient pressure on diaphragm 98 and aspiration to cause liquid 94 to flow through apertures 106.

As previously mentioned, it is a much preferred embodiment of this invention to have the dispenser dispense a detergent blend having a color that is indicative of the strength of the blend. Thus, for a dispenser that is set to operate at three fixed positions, the colors can be cream for mild, pink for intermediate, and blue for strong strength blends.

A suitable formula for this purpose is as follows:

Basic Solution
Part A: Parts by weight
Miranol CS conc. _____ 14.0
Standapol WAT _____ 14.0
Maypon 4C _____ 14.0
Ninol AA 62 extra _____ 2.8
Sodium xylene sulfonate, 40% _____ 2.4
Water _____ 46.25

Part B:
Dye solution _____ 0.55
Morton Opacifier E-288 _____ 1.0

Part C:
pH adjusted to 7.4±0.2 with conc. HCl.

Dye Solution
Phenol red _____ 0.10
Thymol blue _____ 0.10
Sodium hydroxide _____ 1.0
Water _____ 98.8

(Combine ingredients and heat to dissolve)

(1) Combine the ingredients of Part A and heat with slow stirring until the Ninol AA62 Extra has dissolved.
(2) Cool to room temperature.
(3) Add the dye solution. The opacifier should be added slowly with rapid agitation. Continue rapid agitation for about 30 minutes after addition of the opacifier. Unless the opacifier is very well dispersed, it will tend to separate.
(4) Adjust pH.

Concentrate
Bentonite #660 _____ 1.0
Sodium hydroxide _____ 6.0
Dequest 2006 _____ 15.0
Silica #213 _____ 15.0
Water _____ 63.0

Dissolve the sodium hydroxide in a portion of the water. Cool to room temperature and add the remaining ingredients. Agitate for 30 minutes with a high speed mixer. The silica is used to impart a mild souring action.

Suppliers of the Materials

Miranol CS Conc.—Miranol Chemical Co., 277 Coit Street, Irvington, New Jersey.
Standapol WAT—Standard Chemical Products, Inc., 1301 Jefferson Street, Hoboken, New Jersey.
Maypon 4C, Ninol AA62 Extra. Ninex 303 (Sodium xylene Sulfonate, 40%)—Maywood Chemical Works, Div., Stephan Chemical Company, 100 West Hunter Avenue, Maywood, New Jersey.
Dequest 2006—Monsanto Chemical Co., 800 North Lindbergh Blvd., St. Louis, Missouri.
Bentonite #660, #213—Whittaker, Clark & Daniels, Inc., 100 Church Street, New York, New York.
Morton Opacifier E-288—Morton Chemical Company, 110 North Wacker Drive, Chicago, Illinois.

Besides dispensing a detergent blend useful for such tasks as the light cleaning of dishes to the cleaning of dirty floors, this invention can be applied to the dispensing of the following types of detergent blends:

(1) The concentrate is a bleach, whitening or brightening agent and the abse is a standard laundry detergent.
(2) The concentrate imparts cold cleaning strength to a standard laundry detergent. Normally this is suitable only for hot washes.
(3) The concentrate adds solvating power to a standard type of window or automobile detergent.
(4) The base is a standard hair shampoo and the concentrate is added to make it a rinse solution.
(5) The concentrate is used to vary the strength of a hand laundry detergent to make it useful for washing synthetics, cottons and woolens.
(6) The concentrate is used to vary the effectiveness of a base detergent to make it particularly effective for cleaning a certain metal, for example, copper, aluminum or stainless steel.

We claim:
1. A dispenser for dispensing a predetermined mixture of two liquid detergents in variable, identifiable portions comprising:
a first liquid containing chamber;
a second liquid containing chamber;
a high strength liquid detergent contained within said first chamber;
a relatively greater amount of mild liquid detergent contained within said second chamber, said mild liquid detergent being compatible with said high strength liquid detergent;
a mixing chamber for mixing the liquid detergent dispensed from said first and second chambers;
a dispensing passageway connected to said mixing chamber;
connecting passageways connecting said first and second chambers to said mixing chambers;
a hand operated valve means for varying the flow of liquid detergent through one of said connecting passageways relative to the flow of liquid detergent through the other said connecting passageways;
and, an indicator in at least one of said liquid detergents which produced a predetermined color that varies in accordance with the relative proportions of the liquid detergents when the detergents are mixed together.

2. The dispenser of claim 1 wherein one of said detergents contains a pH indicator which gives a predetermined color to the dispensed detergent blend dependant on the mixing ratio of the dispensed high strength and mild detergents.

3. The dispenser of claim 1 further characterized by indicia means cooperatively associated with said valve means for selecting the proportions of the detergents to be dispensed and thereby, the color of the dispensed blend.

4. A hand-held dispenser for dispensing a blend of liquids of predetermined characteristics, comprising:
   a self-standing first container open at the top and forming a first chamber;
   a second container presurably mating and fitting within the opening in said first container such that liquid cannot pass between the two, said second container forming a second chamber having at least one wall in pressure communication with a wall of said first chamber;
   a mixing chamber above said second chamber;
   a first passageway connecting said first chamber to said mixing chamber and passing through said second chamber;
   a small passageway from said second chamber to said mixing chamber which is inoperative to allow liquid to flow from said second chamber to said mixing chamber unless liquid is flowing from said first chamber to said mixing chamber and when operative, allowing the passage of liquid therethrough;
   a hand operable valve mens operative to vary the flow of liquid through said first passageway;
   a rotatable cap incorporating said mixing chamber and said valve means and adapted to engage the walls of said first container at the upper portion thereof, said cap having a dispensing passageway connecting with said mixing chamber, and
   indicia on said cap indicating the relative ratio of liquids being dispensed from said chamber,
   said dispenser being operative to dispense said blend of liquids only when in an inverted position.

5. A dispenser for dispensing two liquids in predetermined variable proportions comprising:
   a first chamber adapted to contain a first liquid;
   a second chamber positioned within said first chamber and adapted to contain a liquid different from that in the first chamber, said second chamber having a smaller volume than said first chamber whereby pressure exerted upon said first chamber is transmitted to said second chamber to discharge the liquid therefrom;
   a mixing chamber for mixing the liquids discharged from said chambers;
   a dispensing passageway connected to said mixing chamber;
   a first connecting passageway connecting said first chamber to said mixing chamber;
   a second connecting passageway connecting said second chamber to said mixing chamber;
   a discharge orifice positioned in the inlet to said second connecting passageway, the size of said orifice being a function of the viscosity of the liquid in said second chamber and being selected to prevent gravity discharge of said second chamber liquid; and
   valve means at the outlet of said second conecting passageway for selectively varying the flow of liquid through said second chamber connecting passageway relative to the flow of liquid through said first chamber connecting passageway.

6. The dispenser of claim 5 wherein said mixing chamber and first connecting passageway form a venturi tube and said second connecting passageway discharges into said tube at a point of reduced pressure.

7. The dispenser of claim 5 wherein said first chamber is formed from a hand squeezable material and said second chamber includes a flexible diaphragm in fluid communication with a portion of said first chamber.

References Cited

UNITED STATES PATENTS

| 2,510,269 | 6/1950 | Winter. | |
| 2,566,588 | 9/1951 | Thompson | 222—48 |
| 2,582,026 | 1/1952 | Friedman | 222—48 |
| 2,655,407 | 10/1953 | Ingell. | |
| 2,663,463 | 12/1953 | Benbury et al. | 222—215 |
| 3,152,731 | 10/1964 | Prussack | 222—145 |
| 3,200,995 | 8/1965 | Ganginisch | 222—215 XR |
| 3,217,931 | 11/1965 | Farrar et al. | 222—94 |
| 1,629,821 | 5/1927 | Jacovatos | 222—134 |
| 1,969,533 | 8/1934 | Pipes et al. | 222—134 |
| 2,685,985 | 8/1954 | Howell | 222—134 |

FOREIGN PATENTS

| 645,813 | 7/1962 | Canada. |
| 505,875 | 5/1939 | Great Britain. |

ROBERT B. REEVES, Primary Examiner

U.S. Cl. X.R.

222—145

UNITED STATES PATENT OFFICE
CERTIFICATE OF CORRECTION

Patent No. 3,508,682          Dated April 28, 1970

Inventor(s) Morton Hollis and Kenneth N. Sherman

It is certified that error appears in the above-identified patent and that said Letters Patent are hereby corrected as shown below:

> Column 5, line 9, the word "consitute" should be "constitute";
>
> Column 5, line 26, the word "intergarl" should be "integral";
>
> Column 7, line 56, the numbers "7.4" should be "7.0";
>
> Column 8, line 11, the word "souring" should be "scouring";
>
> Column 8, line 34, the word "abse" should be "base";
>
> Column 8, line 72, the word "produced" should be "produces";
>
> Column 9, line 31, the word "mens" should be "means".

(SEAL)
Attest:

Edward M. Fletcher, Jr.
Attesting Officer

WILLIAM E. SCHUYLER, JR.
Commissioner of Patents